United States Patent
Schrauwen et al.

(10) Patent No.: US 7,725,000 B2
(45) Date of Patent: May 25, 2010

(54) METHOD FOR EFFECTIVE REFRACTIVE INDEX TRIMMING OF OPTICAL WAVEGUIDING STRUCTURES AND OPTICAL WAVEGUIDING STRUCTURES

(75) Inventors: Jonathan Schrauwen, Gentbrugge (BE); Dries Van Thourhout, Ghent (BE); Roeland Baets, Deinze (BE)

(73) Assignee: IMEC, Leuven (BE)

( * ) Notice: Subject to any disclaimer, the term of this patent is extended or adjusted under 35 U.S.C. 154(b) by 0 days.

(21) Appl. No.: 12/354,603

(22) Filed: Jan. 15, 2009

(65) Prior Publication Data

US 2009/0180747 A1    Jul. 16, 2009

Related U.S. Application Data

(60) Provisional application No. 61/021,250, filed on Jan. 15, 2008.

(51) Int. Cl.
*G02B 6/10* (2006.01)
*G02B 6/00* (2006.01)

(52) U.S. Cl. ................ 385/129; 385/147
(58) Field of Classification Search ............ 385/15–17, 385/27, 31, 37, 29, 129
See application file for complete search history.

(56) References Cited

U.S. PATENT DOCUMENTS

| | | | |
|---|---|---|---|
| 5,117,470 A * | 5/1992 | Inoue et al. | 385/14 |
| 5,768,452 A * | 6/1998 | Atkins et al. | 385/27 |
| 7,020,372 B2 * | 3/2006 | Lee et al. | 385/129 |
| 2008/0253728 A1 * | 10/2008 | Sparacin et al. | 385/132 |

FOREIGN PATENT DOCUMENTS

| | | |
|---|---|---|
| EP | 0731364 | 11/1996 |
| WO | WO02/25338 | 3/2002 |
| WO | WO2004/010181 | 1/2004 |
| WO | WO2007/011727 | 1/2007 |
| WO | WO2008/030468 | 3/2008 |

OTHER PUBLICATIONS

European Search Report, European Patent Application 09150649.3 dated Mar. 19, 2009.

* cited by examiner

*Primary Examiner*—Akm E Ullah
(74) *Attorney, Agent, or Firm*—McDonnell Boehnen Hulbert & Berghoff LLP

(57) ABSTRACT

A method for trimming an effective refractive index of optical waveguiding structures made for example in a high refractive index contrast material system. By compaction of cladding material in a compaction area next to patterns or ridges that are formed in the core material for realizing an optical waveguiding structure, the effective index of refraction of the optical waveguiding structure can be trimmed. Thus, the operating wavelength of an optical component comprising such an optical waveguiding structure can be trimmed. An optical waveguide structure thus obtained is also disclosed.

16 Claims, 5 Drawing Sheets

METHOD FOR EFFECTIVE REFRACTIVE INDEX TRIMMING OF OPTICAL WAVEGUIDING STRUCTURES AND OPTICAL WAVEGUIDING STRUCTURES

CROSS-REFERENCE TO RELATED APPLICATIONS

This application claims priority to U.S. Provisional Application Ser. No. 61/021,250 filed Jan. 15, 2008, the contents of which are incorporated by reference herein in its entirety.

TECHNICAL FIELD

This disclosure relates to a method for trimming an effective refractive index of optical waveguiding structures made for example in a high refractive index contrast material system, for example an SOI material system, and to optical waveguiding structures thus obtained.

BACKGROUND

Silicon-on-insulator (SOI) is gaining interest as a material system for ultra-compact integrated photonic circuits. An advantage of this material system is the high refractive index contrast between the silicon and the adjacent oxide or air, enabling small bend radii and dense integration. Furthermore, as silicon is the standard material that is used for microelectronic integrated circuits, this opens the door for photonics to use the standard, mature and commercially available technology used in microelectronic fabs. SOI technology opens the possibility for integration of photonic and microelectronic devices on the same wafer.

Optical functionalities can be realized on SOI substrates by etching or writing a pattern in the functional silicon layer. This can for example be done with electron beam lithography, which is however a serial fabrication technique and therefore unattractive for mass fabrication. When using optical lithography for defining the patterns, variations of the critical dimensions are inevitable. These variations can be caused by wafer non-uniformity or by non-uniformity within one chip and can affect the behavior or the properties of the optical component. For example, ring resonators are highly sensitive to fabrication errors. A fabrication error of 1 nm typically leads to a 1 nm shift of the resonance wavelength. In practice the resonance wavelength shift can exceed 1 nm, which is unacceptable for many applications. Even the fabrication of identical devices on one wafer is difficult due to wafer scale variations. This problem may be solved by altering the devices after fabrication, for example by tuning or by trimming. Tuning leads to a time-dependent and reversible change of the optical device or component. Trimming results in an irreversible static change of the optical device or component.

Tuning of silicon-based optical components can for example be done thermally, by heating the entire chip comprising the optical components or by providing electrical heaters close to an area of interest. However, if one envisages a plurality of components, e.g. resonators, on a single chip, thermal tuning with electrical heaters requires the incorporation of a heater for every resonator, which may lead to high power consumption and a high device complexity. Another tuning method that may be used is carrier injection or depletion, requiring local doping of the silicon. For providing small modifications after fabrication, trimming techniques may be preferred instead of tuning techniques.

The resonant wavelength of a ring resonator is proportional to its optical path length, being the product of the physical path length and the effective index of refraction. Post-fabrication trimming of the resonance wavelength can therefore be obtained by trimming or changing this effective index of refraction. An increase in effective index causes a red shift (i.e. a shift towards a longer wavelength) of the resonance wavelength, while a decrease in effective index causes a blue shift (i.e. a shift towards a shorter wavelength) of the resonance wavelength.

In several low to medium index contrast material systems, trimming of the effective index of refraction was demonstrated based on direct UV irradiation or electron beam irradiation of the core material, such as silica glass, SiN or SiON. These core materials can be compacted when exposed to UV radiation or electron beam radiation, the compaction resulting in an increase in refractive index of the core material, and thus an increase of the effective index of refraction. As the compacted core material contains most of the optical mode, relatively large shifts in effective indices and thus in resonance wavelength can be obtained. For example, with SiN as a core material, more than 10 nm of resonance wavelength shift can be obtained for ring resonators operating at 1550 nm.

In high index contrast material systems, i.e. material systems with a large difference in refractive index (e.g. larger than 1) between a core material and a cladding material, such as for example SOI, the core material, such as for example silicon, is often not susceptible to compaction by either UV irradiation or electron beam irradiation.

DISCLOSURE OF THE INVENTION

The present disclosure provides a method for post-fabrication trimming of an effective refractive index of an optical waveguiding structure. The method of the present disclosure can be used for trimming of an operating wavelength of an optical component.

The present disclosure provide a optical waveguiding structures with finely trimmed effective refractive index and optical components with finely trimmed operating wavelengths.

These aims are achieved as defined in the independent claims.

As used herein, with "operating wavelength" is intended to mean a wavelength at which an optical component is designed to operate, e.g. a resonance wavelength, a transmission wavelength, a center wavelength or an output wavelength.

The effective index of refraction or the effective refractive index is the index of a guided optical mode as it can be derived from Maxwell's equations. It is a number quantifying the phase delay per unit length of e.g. a waveguide, relative to the phase delay in vacuum.

The present disclosure is particularly useful for effective refractive index trimming of optical waveguiding structures formed in a material system wherein the light guiding layer or core layer is not susceptible to compaction by irradiation, such as for example compaction by UV irradiation or by electron beam irradiation, although the disclosure is not restricted thereto and can also be applied to systems wherein the core material is a compactible material. The method of the present disclosure can for example be used for post-fabrication trimming of an effective refractive index of optical waveguiding structures formed in a material system with a large difference in refractive index (e.g. difference in refractive index>1) between a core material and a cladding material, for example a material system comprising a cladding material such as $SiO_2$, SiN, SiON, $Al_2O_3$, $TiO_2$, spin-on glass or borophosphosilicate glass and a core material such as silicon, InP, GaAs or ZnS, such as e.g. a silicon/oxide material system. The method allows local and independent trimming of an operating wavelength, e.g. resonance wavelength, of optical components on a chip and it allows compensating for operating wavelength variations, e.g. resonance wavelength variations.

According to the disclosure, it has been found that by compaction of the cladding material in a compaction area next to patterns or ridges that are formed in the core material for realizing an optical waveguiding structure, the effective index of refraction of the optical waveguiding structure can be trimmed and thus the operating wavelength of an optical component comprising such an optical waveguiding structure can be trimmed. Compaction of the cladding material can for example be done by means of electron beam irradiation, ion beam irradiation or by UV irradiation. Due to the limited light confinement in the cladding layer, the trimming range for e.g. the resonance wavelength of an optical component such as a ring resonator is expected to be very limited (<1 nm). However, it was surprisingly found that the trimming range can be greatly increased (>5 nm) by compacting the cladding material next to (so not underneath) and at both sides of the patterns or ridges defined in the core material for forming optical components. In this context, the cladding material next to the ridges refers to a volume of the cladding material that, after orthogonal projection of the structure on a plane parallel to the cladding surface, would be adjacent to (i.e. touching or near or close to) and not overlapping the ridges. By appropriate selection of the irradiation energy, i.e. using an irradiation energy that is sufficiently low for preventing penetration of the radiation through the core layer, the volume compaction can be restricted to the cladding material next to the ridges of core material. In other embodiments the volume compaction can be restricted to the cladding material next to the ridges by shielding the ridges from the irradiation. It has been found that compaction of the cladding material next to the ridges, at both sides of the ridges, causes tensile strain in the core material. The tensile strain results in a change in the refractive index of the core material, e.g. an increase in the refractive index in case the core material is silicon. In this case the effect of the cladding material compaction on the effective refractive index is thus strengthened by the strain it induces in the silicon core. Both effects can generate an increase in effective refractive index, which may for example result in a red shift of an operating wavelength, e.g. resonance wavelength, of an optical component.

The methods of the present disclosure may be used for compensating for variations on wafer scale and on chip scale due to fabrication imperfections such as optical lithography imperfections. Specifically in combination with vertical grating couplers and live readout, this technique is suited for rapid and automatic wafer-scale trimming of components before packaging.

In preferred embodiments, the optical waveguiding structures comprise no top cladding layer or only a very thin cladding layer (e.g. thinner than 50 nm).

The present embodiment provides a method for trimming an effective refractive index of an optical waveguiding structure, the optical waveguiding structure comprising one or more ridges made of a core material adjacent to a layer of cladding material, the cladding material being a compatible material, characterized in that the method comprises the steps of: defining a compaction area on the cladding material next to at least one of the one or more ridges; and compacting the cladding material by irradiation of the cladding material only in the compaction area to create a strain in the core material of the at least one ridge, whereby the effective refractive index of the waveguiding structure is trimmed. In embodiments of the disclosure the compaction area comprises a first area and a second area, the first and second area being defined at opposite sides of the at least one ridge. Compacting the cladding material may comprise irradiating the cladding material, for example by an electron beam, an ion beam or UV light. In embodiments of the present disclosure irradiation may be performed in an irradiation area, the irradiation area being composed of the compaction area and an area of core material. Irradiation may be done with a predetermined low irradiation energy that is chosen sufficiently low to prevent penetration of irradiation through the core material up to the cladding material underneath the core material.

The method of the present disclosure may be used for trimming an effective refractive index of an optical waveguiding structure made in a material system wherein the core material is a non-compatible material. The core material may for example be silicon, InP, GaAs or ZnS. The cladding material may for example be $SiO_2$, SiN, SiON, $Al_2O_3$, $TiO_2$, spin-on glass or borophosphosilicate glass. For example, a silicon-on-insulator material system may be used, wherein the core material is silicon and wherein the cladding material is silicon oxide. The method may also be used for trimming an effective refractive index of an optical waveguiding structure made in a material system wherein the core material is a compactible material.

The method of the present embodiment may be used for trimming an operating wavelength of an optical component comprising such a waveguiding structure. For example, the method of the present embodiment may be used for trimming an operating wavelength of a ring resonator, an arrayed waveguide grating, a mach-zehnder interferometer or a nanophotonic component comprising photonic crystals or plasmonic structures.

The method may further comprise monitoring the effective refractive index of the optical waveguiding structure during the irradiation.

The present disclosure is furthermore related to optical waveguiding structures obtainable by a post-fabrication trimming method. An optical waveguiding structure comprising one or more ridges made of a core material adjacent to a layer of cladding material is provided, wherein the cladding material is a compatible material and wherein the layer of cladding material comprises an area of compacted cladding material next to at least one of the one or more ridges, the compacted cladding material inducing a strain in the core material of the at least one ridge, whereby an effective refractive index of the optical waveguiding structure is trimmed. In embodiments of the present disclosure the area of compacted cladding material comprises a first area and a second area, the first and second area being defined at opposite sides of the at least one ridge. The difference between the refractive index of the core material and the refractive index of the cladding material may be larger than 1. The core material may for example be silicon, InP, GaAs or ZnS. The cladding material may for example be $SiO_2$, SiN, SiON, $Al_2O_3$, $TiO_2$, spin-on glass or borophosphosilicate glass. The optical waveguiding structure may for example be formed in a silicon on insulator material system. The optical waveguiding structure may be part of an optical component such as for example a ring resonator, an arrayed waveguide grating, a mach-zehnder interferometer or a nanophotonic component comprising photonic crystals or plasmonic structures.

The disclosure contains a detailed description of several embodiments. It is clear that other embodiments can be configured according to the knowledge of persons skilled in the art without departing from the true spirit or technical teaching of the disclosure, the embodiments being limited only by the terms of the appended claims.

BRIEF DESCRIPTION OF THE DRAWINGS

The embodiments will be further elucidated by means of the following description and the appended drawings.

DETAILED DESCRIPTION

Figure 1A:
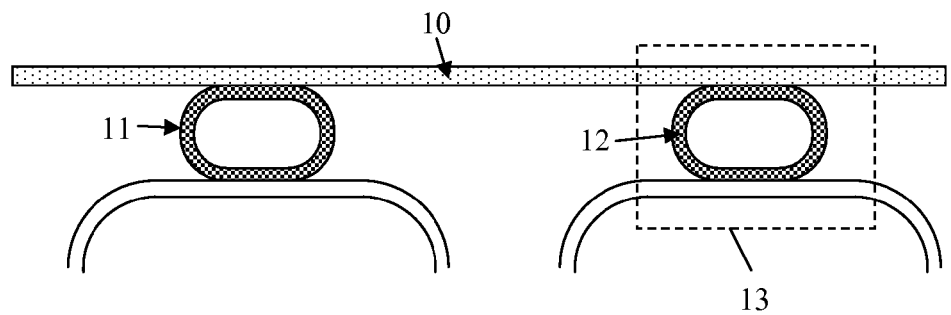
FIG. 1(a) illustrates the structure used in experiments: one ring resonator is trimmed by electron beam compaction; the other one is used as a reference to exclude temperature and ambient variations.

In the following detailed description, numerous specific details are set forth in order to provide a thorough understanding of the disclosure and how it may be practiced in particular embodiments. However it will be understood that the present embodiments may be practiced without these specific details. In other instances, well-known methods, procedures and techniques have not been described in detail, so as not to obscure the present embodiments. While the present disclosure will be described with respect to particular embodiments and with reference to certain drawings, the reference is not limited hereto. The drawings included and described herein are schematic and are not limiting. It is also noted that in the drawings, the size of some elements may be exaggerated and, therefore, not drawn to scale for illustrative purposes.

Furthermore, the terms first, second and the like in the description, are used for distinguishing between similar elements and not necessarily for describing a sequence, either temporally, spatially, in ranking or in any other manner. It is to be understood that the terms so used are interchangeable under appropriate circumstances and that the embodiments described herein are capable of operation in other sequences than described or illustrated herein.

Moreover, the terms top, bottom, over, under and the like in the description are used for descriptive purposes and not necessarily for describing relative positions. It is to be understood that the terms so used are interchangeable under appropriate circumstances and that the embodiments described herein are capable of operation in other orientations than described or illustrated herein.

It is to be noticed that the term "comprising" should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B.

In the present context, "tuning" is used for indicating changes that are reversible (such as for example thermo-optical tuning) and "trimming" is used for indicating irreversible changes.

In the context of the present embodiments a high refractive index contrast material system is a material system that may e.g. be used for fabricating optical components or circuits and in which the refractive index difference between a core material and a cladding material is at least 1.

The effective index of refraction or the effective refractive index is the index of a guided optical mode as it can be derived from Maxwell's equations. It is a number quantifying the phase delay per unit length of e.g. a waveguide, relative to the phase delay in vacuum.

In the context of the present disclosure, a compactible material is a material that can be compacted by irradiation such as for example by UV irradiation, ion beam irradiation or electron beam irradiation. For example, silicon oxide, silicon nitride and silicon oxinitride are considered as compactible materials. A non-compactible material is a material that is not susceptible to compaction by irradiation such as UV irradiation, ion beam irradiation or electron beam irradiation. For example, semiconductor materials such as silicon or indium phosphide are considered as non-compactible materials.

This disclosure relates to a method for post-fabrication trimming of an effective refractive index of optical waveguiding structures, more in particular for trimming an effective refractive index of optical waveguiding structures fabricated in a high refractive index contrast material system, wherein the core material is a non-compactible material such as for example Si, InP or GaAs, and wherein the cladding comprises a compactible material such as for example $SiO_x$, SiN or SiON. Trimming of the effective refractive index leads to a change of an optical pathlength in the waveguiding structure. In optical components comprising such a waveguiding structure, this can result in a change of an operating wavelength. For example, in a ring resonator a change in the effective index of refraction, leading to a change of the optical pathlength in the ring, results in a change of the resonant wavelength of the ring resonator.

The methods described herein allow one to locally and independently trim an operating wavelength, e.g. resonance wavelength, of optical components (such as for example ring resonators) on a chip and to compensate for operating wavelength, e.g. resonance wavelength, variations. The methods of the present embodiments can be used for post-fabrication trimming of an operating wavelength, e.g. resonance wavelength, of optical components formed in a high refractive index contrast material system such as e.g. a silicon/oxide material system. It is an advantage of such trimming methods as compared to some tuning methods that the need for providing a tuning element (such as e.g. a heating element) for every optical component on a chip is avoided. When using such methods of the present disclosure, one single temperature control element may be sufficient for thermal stabilization of all devices on a chip.

Although the method of the present embodiment is described here for material systems comprising a core material that is not susceptible to compaction by irradiation, the method may also be used for other material systems, for example for material systems wherein the core material is a compactible material. For example, in such a material system both the core material and the cladding material next to the core material may be compacted in order to change the effective index of refraction of the structure.

An exemplary method comprises, after fabrication of the optical waveguiding structure, irradiating the cladding material in a compaction area next to the ridges formed in the core material for forming the optical waveguiding structure and at both sides of the ridges, for example irradiating by an electron beam, UV light, or ions, thereby causing a volume compaction or densification of the cladding material in that area. In preferred embodiments, the optical waveguiding structures have no top cladding layer or only a very thin top cladding layer (e.g. thinner than 50 nm). By appropriate selection of the irradiation energy, i.e. by selection of an irradiation energy that is sufficiently low for preventing penetration of the radiation through the core layer, the volume compaction can be restricted to the cladding material next to the ridges of core material, such that a horizontal tensile strain (i.e. substantially parallel to the cladding surface and substantially orthogonal to a propagation direction in the core material) is induced in the core material. In this context, the cladding material next to the ridges refers to a volume of the cladding material that, after orthogonal projection of the structure on a plane parallel to the cladding surface, would be adjacent to (i.e. touching or near or close to) and not overlapping the ridges. This tensile strain results in a change in the refractive index of the core material, e.g. an increase in the refractive index if the core material is silicon. In this case, the effect of the cladding material compaction on the effective refractive index is thus strengthened by the strain it induces in the silicon core material. Both effects generate an increase in effective refractive index, resulting in a red shift of an operating wavelength (such as a resonance wavelength) of an optical component comprising such waveguiding structure.

In the following description, a method according to an embodiment is illustrated for an SOI-based material system wherein the core material is silicon and wherein the cladding material is $SiO_2$. However, the method may be used for material systems with other core materials such as for example InP, GaAs, ZnS or other compound semiconductors with a high refractive index (e.g. higher than 3 at 1550 nm) and/or other cladding materials, such as for example SiN, SiON, $Al_2O_3$, $TiO_2$, spin-on glass or borophosphosilicate glass. Furthermore, the description refers to the use of electron beam irradiation. Other means may be used for compacting the cladding material, such as for example ion beam irradiation or UV irradiation or irradiation with high energy particles.

In the following, experiments are described illustrating post-fabrication trimming of the resonance wavelength of ring oscillators according to embodiments, wherein compaction of the cladding layer is obtained by electron beam irradiation. The resonance wavelength of silicon ring oscillators is extremely sensitive to changes of temperature and to changes of the surrounding medium. In order to be able to investigate the resonance shifts caused only by the electron beam irradiation, external factors were excluded in the experiments performed. Therefore a circuit as shown in FIG. 1(a) was fabricated, with two almost-identical rings 11, 12, the two rings having different resonance wavelengths (1524 nm for the ring 12 to be trimmed and 1529 nm for the reference ring 11) and being serially connected to the same waveguide 10. Only one of these rings (ring 12) was irradiated with a scanning electron beam, in an irradiation area 13 as schematically indicated in FIG. 1(a). The transmission spectrum of such a circuit features two superimposed ring spectra of which one moves or shifts as a result of the irradiation. Both spectra can shift due to external factors such as e.g. temperature variations. By evaluating only relative resonance wavelength shifts between the two ring spectra the external influences such as temperature variations could be excluded. Thereby it is assumed that the trimmed ring 12 and the reference ring 11 have a substantially identical response to changes in temperature and humidity, and that all relevant external factors act on both rings at the same time and in the same way. Experiments were performed both in situ and ex situ.

Figure 1B:
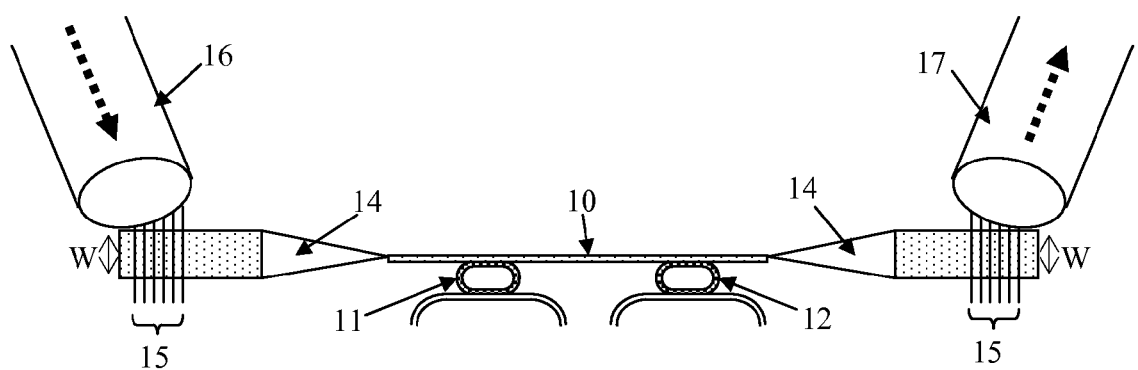
FIG. 1(b) shows the set-up used for trimming experiments.

In situ trimming experiments were performed inside the vacuum chamber of a scanning electron microscope (FEI Nova 600 scanning ion/electron microscope). On a photonic circuit, the access waveguides 10 to the resonator rings 11, 12 were provided with tapered sections 14 (as illustrated in FIG. 1(b)) to increase a waveguide width W to about 10 micrometer. Vertical grating couplers 15 were provided, to which single mode optical fibers 16, 17 (for transporting the input and output signals respectively) were glued at an angle of 10 degrees to the surface normal. The fibers 16, 17 were guided out of the vacuum chamber through vacuum feed-throughs. The fiber 16 for guiding the input signal was connected to a light source, more in particular a super luminescent LED with a center wavelength of 1530 nm, and the fiber 17 for guiding the output signal was connected to an optical spectrum analyzer with a resolution of 60 pm. This set-up allows measuring the resonance wavelength during trimming of a resonator ring 12. The optical circuit, with grating couplers 15, tapered sections 14, waveguides 10 and ring resonators 11, 12, was fabricated by DUV lithography in a standard CMOS foundry, based on an SOI material system. The thickness of the bottom cladding layer (oxide) was 2 µm and the thickness of the silicon core layer was 220 nm. There was no top cladding layer. The resonator was a racetrack resonator with a radius of 4 µm and with 3 µm long straight sections. An optical output spectrum was measured every 10 s.

Compaction of the $SiO_2$ cladding material next to one of the ring resonators (12) was induced by means of a 2 keV electron beam. A total area 13 of about 25 µm×25 µm was exposed to an electron beam that was scanned across the resonator ring 12 and the access waveguide 10, in the irradiation area 13. Irradiation in the irradiation area 13 results in compaction of the cladding material in a compaction area, the compaction area corresponding to the part of the irradiation area where no core material is present. The resonance wavelength of the trimmed ring 12, which was initially around 1524 nm, was thereby red-shifted to overlap the resonance wavelength (1529 nm) of the reference ring 11. The ring resonator 12 was trimmed in three subsequent steps. In a first step (step 1) a 0.21 nA beam was scanned across a 25.6 µm×22.1 µm area for 360 s and a resonance wavelength shift of 1.24 nm to 1.27 nm was measured. In a next step (step 2) the same beam was scanned over the same area for 300 s to reach an additional shift of 0.82 nm to 1.10 nm. In a final step (step 3) a 0.84 nA beam was scanned over a 17.1 µm×14.8 µm area for 410 s, leading to a subsequent red-shift of 2.76 nm to 2.77 nm. In total this leads to a 4.91 nm to 5.16 nm red shift of the resonance wavelength of the silicon ring resonator 12. Thus the resonance wavelength of the trimmed resonator ring 12 was substantially equated with that of the non-trimmed resonator ring 11 (1529 nm).

Figure 2:
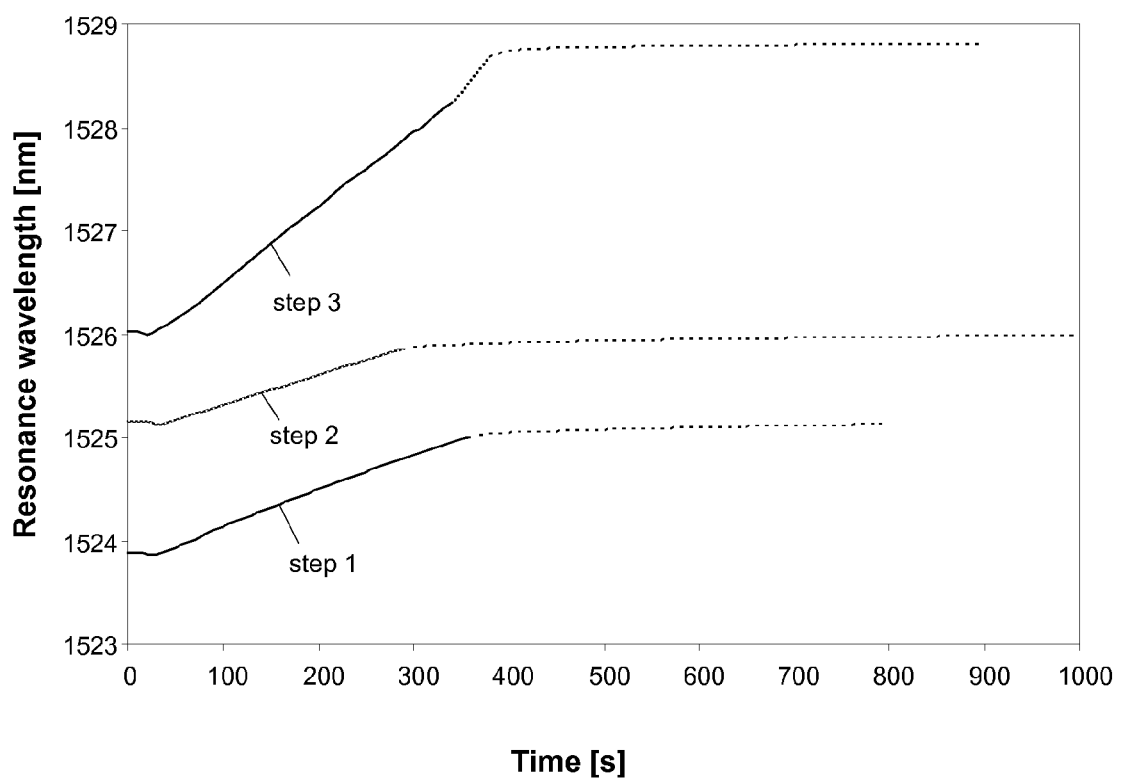
FIG. 2 illustrates the effect on the resonator resonance wavelength of three subsequent electron beam irradiation steps used in an in-situ trimming experiment.

FIG. 2 shows the evolution of the resonance peak of the trimmed ring resonator 12, extracted from the measured spectra, wherein one spectrum was measured every 10 s. The curves represent the position of the fitted lorentzian peak maxima. The full lines show the evolution during the actual electron beam irradiation in three steps (step 1, step 2, step 3), and the dashed lines show the settling of the resonance wavelength after each irradiation step. The dotted line (in between the full line corresponding to electron beam irradiation for step 3 and the dashed line corresponding to resonance wavelength settling for step 3) corresponds to the region where both resonance peaks (i.e. the resonance peak of the reference ring 11 and the resonance peak of the trimmed ring 12) merge and wherein the single peak fitting algorithm used yields inconclusive results. As is apparent from the results shown in FIG. 2, in the range considered in the experiment, there is a substantially linear relationship between the resonance wavelength shift and the irradiation dose (here, corresponding to the number of electrons per unit area).

It is also clear from the graph (FIG. 2) that in the beginning of the electron beam exposure there is a small blue shift of the resonance wavelength. In this experiment a blue shift in the range between 100 pm and 200 pm was observed. Furthermore, after exposure there is a settling of the peak towards a longer wavelength. For example, a 153 pm red shift was measured 45 minutes after the second trimming step. This may be caused by charging of the oxide and subsequent generation of carriers in the silicon, and partly by temperature variations due to electron bombardment. Because of these wavelength shifts, i.e. a blue shift in the beginning of the electron beam exposure and a red shift after electron beam exposure, there is some uncertainty on the measured wavelength shifts. The measured wavelength shift slightly depends on the time at which the shift is measured. Therefore, for the three subsequent trimming steps described above, ranges of wavelength shifts are reported. The total wavelength shift (4.91 nm to 5.16 nm) reported is the difference between the final resonance wavelength and the initial resonance wavelength.

To evaluate the propagation losses, the Q-factor of the trimmed resonator 12 was extracted from the measured spectra. During the first trimming step the Q-factor of the trimmed resonator decreased from $1.5 \cdot 10^4$ to $1.3 \cdot 10^4$. During the second trimming step an increase of the Q-factor to $1.7 \cdot 10^4$ was observed. These variations may be caused by a varying coupling constant between the mode in the access waveguide 10 and the mode in the ring resonator 12. It may vary as a result of compaction of the coupling region, which can alter the mode profile and the distance between the waveguide and the ring. The Q-factor slightly decreases to $1.0 \cdot 10^4$ in the third step of the experiment. This may be caused by increasing propagation losses.

It is known that compacted silicon oxide tends to relax over a period of tens of hours after irradiation. For the ring resonator 12 of the experiment described above, a subsequent red shift of 0.15 nm was measured, 5 days after the actual irradiation.

Although in this experiment a three-step procedure was followed, the required shift in resonance wavelength may also be obtained after a different number of steps, e.g. after one step.

Figure 3:
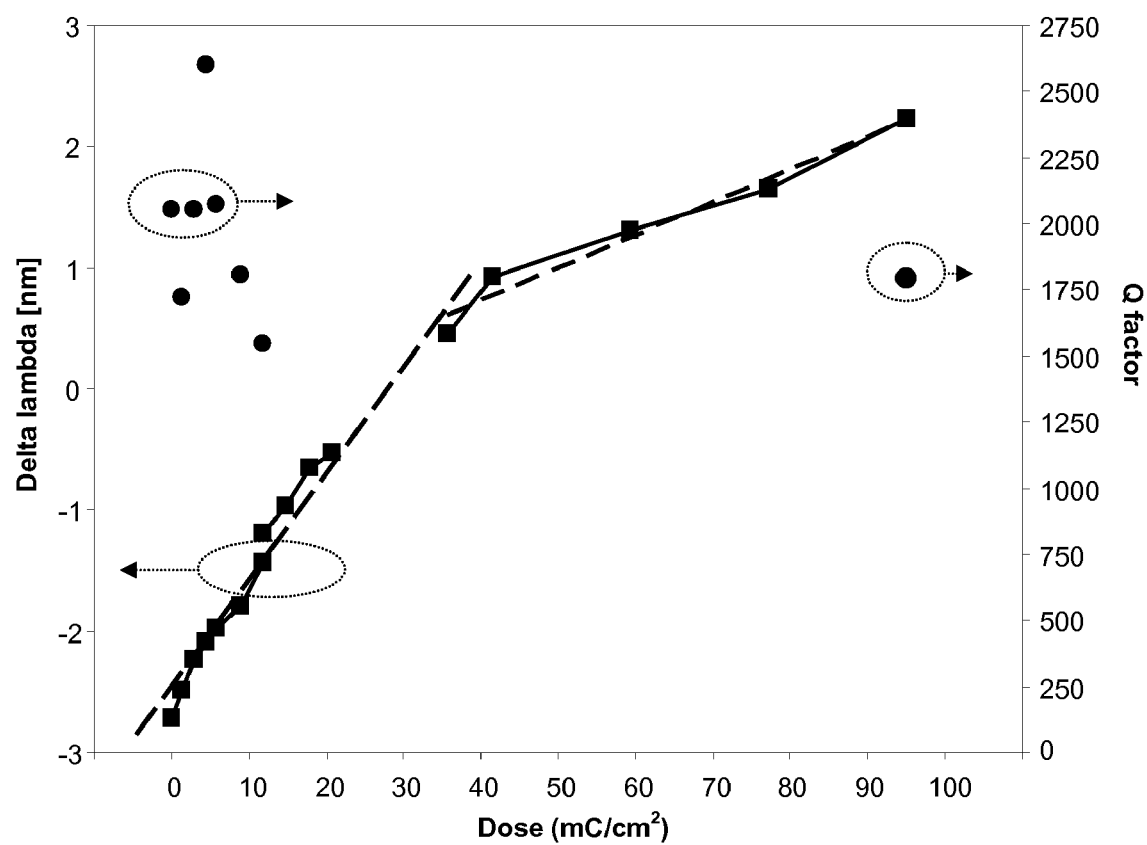
FIG. 3 shows the evolution of the resonance wavelength and the Q-factor during an ex-situ electron beam trimming experiment.
Figure 4:
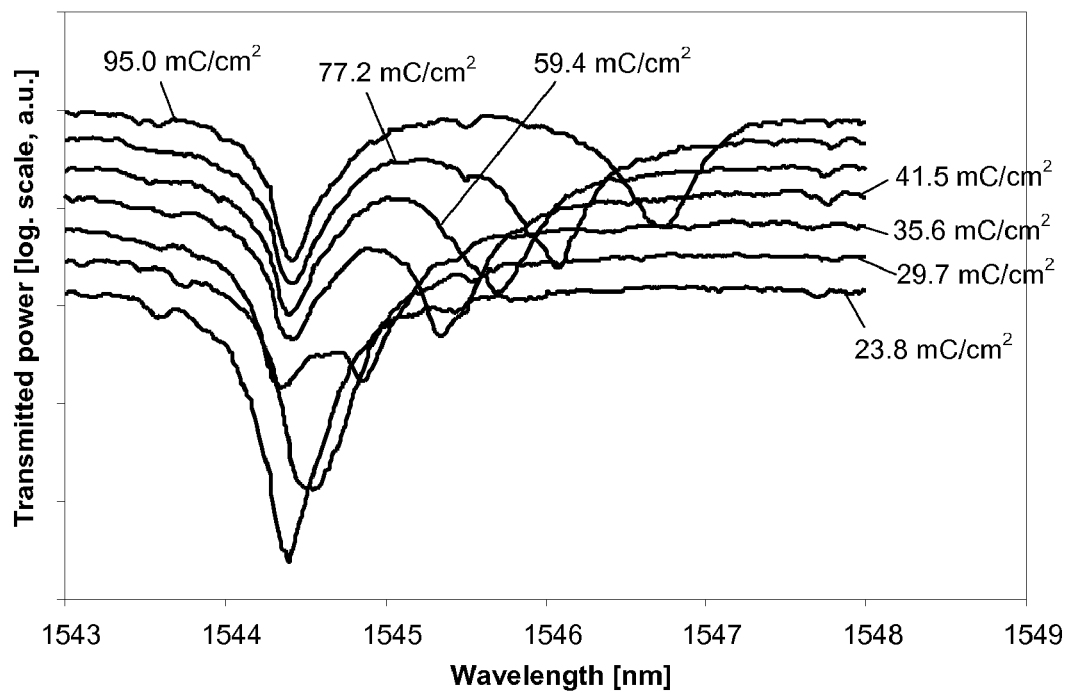
FIG. 4 shows transmission spectra of an ex-situ electron beam trimming experiment.

Ex-situ trimming experiments were performed, wherein electron beam trimming was performed inside a vacuum chamber and wherein the optical transmission spectra were measured outside the vacuum chamber. A circuit as illustrated in FIG. 1(*a*) was used. First the initial transmission spectrum of the circuit was measured. The resonance wavelength of the reference ring 11 was 1544.4 nm and the initial resonance wavelength of the ring 12 to be trimmed was 1541.6 nm. Then the circuit comprising the resonator ring 12 to be trimmed and the reference ring 11 was loaded into a vacuum chamber and irradiated with an electron beam in an irradiation area 13. After that, the circuit was unloaded from the vacuum chamber and measured again. The measurement of the spectrum was performed with the same measurement setup (FIG. 1(*b*)) as for the in-situ experiments, but the measurements were done outside the vacuum chamber and without glueing the fibers. Light was generated from a tunable laser (5 mW), polarization controlled, sent into the circuit via a fiber 16 and a grating coupler 15, sent through the circuit comprising the ring resonators 11, 12, coupled out to a fiber 17 via a grating coupler 15, and detected by a photodiode. This procedure was repeated several times. For each data point the sample was loaded in and out of the vacuum chamber, but the sample always remained in a clean room environment. The evolution of the resonance wavelength shift $\Delta\lambda$ and the Q factor of the trimmed resonator 12 are shown in FIG. 3. The black squares in FIG. 3 each correspond to a measured data point and show the difference between the resonance wavelength of the reference ring 11 and the resonance wavelength of the trimmed ring 12. The squares are grouped by three segmented lines, representing the three different days during which the experiment was conducted. As described for the in-situ experiments, after trimming a subsequent red shift in the order of 100 pm occurs in a period of hours or days. This effect was not incorporated in the ex-situ measurements and can explain the deviations from linear behavior. In FIG. 3 no data points are plotted where the transmission dips (corresponding to the resonance wavelength) of the reference ring 11 and the trimmed ring 12 overlap ($\Delta\lambda \approx 0$). In this range only one dip in resonance wavelength is visible. This is illustrated in FIG. 4, showing the measured transmission spectra during the second part of the ex-situ electron beam trimming experiment (i.e. the transmission spectra measured from the point where the resonance wavelength of both rings 11, 12 coincide). In FIG. 4, it can be seen that at a dose of 23.8 mC/cm$^2$ to 29.7 mC/cm$^2$ only one transmission dip is visible and the resonance wavelength of both rings 11, 12 substantially coincide. For higher doses, two transmission dips can be seen, one for each ring, and the resonance wavelength of the trimmed ring 12 is higher than the resonance wavelength of the reference ring 11. The spectra shown in FIG. 4 are normalized, vertically shifted and shown on a logarithmic scale.

FIG. 3 also shows two dashed lines representing linear fits for two sets of operating conditions. In the lower dose range an electron beam current of 0.14 nA was used (measured with a faraday cup) to scan an irradiation area 13 of 25.6 micrometer×22.1 micrometer. For an irradiation time of 60 s this corresponds to a dose of 1.48 mC/cm$^2$. In the higher dose range an electron beam current of 0.56 nA was used for the same irradiation area 13. The Q-factors were extracted by fitting a lorentzian curve to the transmission dips. These Q-factors are shown as circles in FIG. 3. The Q-factor after a red shift of about 5 nm (corresponding to a dose of 95 mC/cm$^2$) is similar to the initial Q-facture, measured before the trimming experiment. This suggests that only limited optical losses are induced by the trimming process.

Figure 5A:
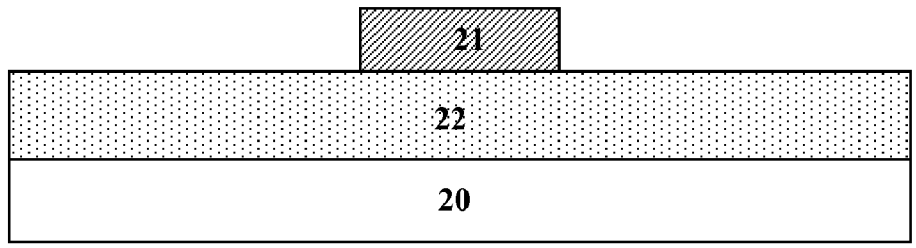
FIG. 5(a) is a cross-section of a silicon ring resonator, showing the silicon ridge and the cladding material.
Figure 5B:
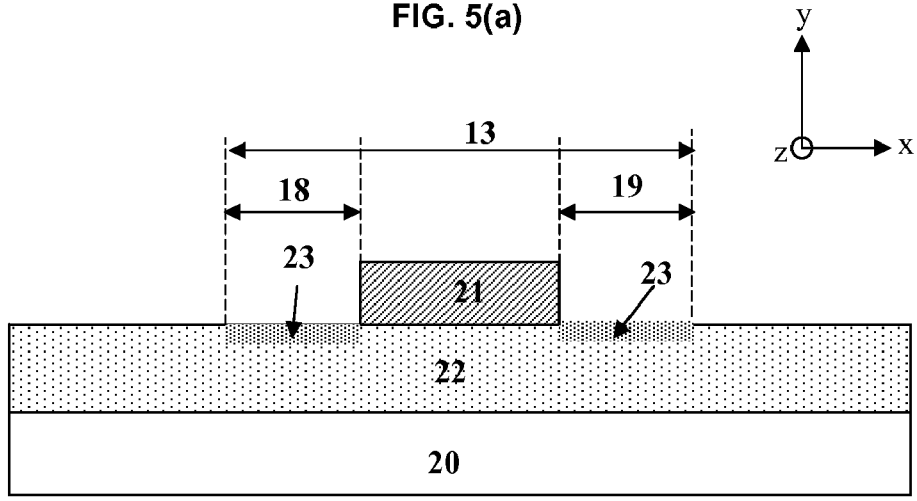
FIG. 5(b) shows the area next to the ridge wherein the cladding material is compacted.

Two distinct physical processes may cause the effective refractive index change of the mode in a silicon ring resonator resulting from electron beam compaction. The first process is an increase of the refractive index of the oxide cladding due to volume compaction. The second process is the strain this oxide compaction induces in the silicon lattice, leading to a larger refractive index of the silicon core. In the experiments described above, 2 keV electrons were used, which have a penetration depth of about 70 nm in Si and SiO$_2$ as calculated with Monte Carlo simulations. FIG. 5(*a*) shows a cross-section of a silicon ring resonator on a substrate 20. For the silicon ring resonator used in the experiments, the silicon ridges 21 forming the ring had a thickness of 220 nm, on top of a 2 μm thick oxide layer 22 acting as a cladding. Therefore, the electrons from the 2 keV electron beam can not penetrate through the silicon layer and they do not reach the oxide underneath the silicon ridges 21. Only the oxide 23 next to the silicon ridges 21 is exposed to the electrons and is compacted (as illustrated in FIG. 5(*b*)). In FIG. 5(*b*) the irradiation area 13 is indicated, as well as the compaction area, the compaction area comprising a first area 18 and a second area 19 defined at opposite sides of the at least one ridge.

The order of magnitude of the expected contribution of the increasing silicon oxide refractive index (resulting from the oxide compaction) to the change in effective refractive index can be estimated. There are very few reports on the maximum attainable compaction by 2 keV electron bombardments. By extrapolation of the data reported in "Ionization dilatation effects in fused silica from 2 to 18-keV electron irradiation", C. B. Norris et al., Journal of Applied Physics, 45(9), 3876-3882, 1974, to the dose ranges considered in the experiments described here, a volume compaction or densification of less than 5% can be expected. The maximum dose of the in situ experiment can be written as $2.8 \times 10^{23}$ keV/cm$^3$ if it is assumed that all the energy is deposited in a 70 nm thick layer. This is about a factor of two higher than what was reported by C. B. Norris et al. To evaluate the change in refractive index caused by this densification the Lorentz-Lorenz relation is considered, which takes into account changes in the polarizability a due to changes of the chemical bonds in the material:

$$\frac{n^2-1}{n^2+2} = \frac{1}{3\varepsilon_0}\frac{\alpha}{V} \tag{1}$$

wherein n is the refractive index of the material, $\varepsilon_0$ is the vacuum dielectric permittivity and V is the volume.

From (1) the following can be derived:

$$\frac{\Delta n}{n} = \frac{(n^2-1)(n^2+2)}{6n^2}\left(\frac{\Delta V}{V} + \frac{\Delta \alpha}{\alpha}\right) \tag{2}$$

where a positive volume change ΔV corresponds to a densification. Although the polarizability increases for low compaction dose and decreases for high doses, Δα/α=0 is a good approximation to estimate the order of magnitude of refractive index change Δn in function of densification. For a refractive index of quartz glass of about 1.5 (comparable to the refractive index of silicon oxide), a volume compaction of 5% causes a refractive index change of 2%.

It was calculated with a mode expansion tool that the mode overlap between the optical mode and the cladding next to the ridge 21, i.e. with the compacted oxide 23, is lower than 1.5%. The effect of a refractive index change of the cladding material was estimated to be below 3% with a total irradiation dose of $2.8 \times 10^{23}$ keV/cm$^3$, being the total dose used in the in-situ experiments described above. It was calculated that this can not lead to more than 0.5 nm shift in resonance wavelength.

Due to the limited contribution of the refractive index change of the cladding material it is likely that the largest fraction of the observed resonance wavelength shift (5 nm) is caused by strain in the silicon lattice, i.e. in the ridge 21. The contribution of strain can be estimated by taking into account the elasto-optical tensor of silicon. One can write the change of the optical impermeability ($\varepsilon^{-1}$) in function of the strain as:

$$\Delta\left(\frac{1}{n^2}\right)_i = p_{ij}S_j \quad i,j = 1,2,\ldots,6, \tag{3}$$

where $p_{ij}$ is the elasto-optical tensor and $S_j$ is a dimensionless array that represents the strain and shear components (with the convention that tensile strain is positive). The six components of the impermeability (i=1, ..., 6) represent the six independent components of the symmetric 3×3 tensor. For material systems with cubic symmetry the elasto-optic tensor has only three independent coefficients:

$$p_{ij} = \begin{pmatrix} p_{11} & p_{12} & p_{12} & 0 & 0 & 0 \\ p_{12} & p_{11} & p_{12} & 0 & 0 & 0 \\ p_{12} & p_{12} & p_{11} & 0 & 0 & 0 \\ 0 & 0 & 0 & p_{44} & 0 & 0 \\ 0 & 0 & 0 & 0 & p_{44} & 0 \\ 0 & 0 & 0 & 0 & 0 & p_{44} \end{pmatrix} \tag{4}$$

For this calculation the axes are chosen such that the three off-diagonal components of the impermeability (i=4,5,6) equal zero (x-axis perpendicular to the propagation direction and in the cladding surface plane, z-axis in the propagation direction, as indicated in FIG. 5). The $p_{11}$ and $p_{12}$ coefficients for silicon at a wavelength of 1.15 micrometer are used: $p_{11}$=−0.101 and $p_{12}$=0.0094. When the oxide next to the silicon ridge 21 is compacted due to the electron bombardment it contracts. However, it can only do so in the vertical direction, i.e. in a direction that is substantially orthogonal to the surface of the oxide cladding layer (i.e. in a direction corresponding to the y-axis, see FIG. 5). Therefore the dominant direction of the remaining stress and strain is in a plane parallel to the plane of the cladding surface. The stress in the oxide layer 22 is tensile, and puts the silicon ridge 21 under tensile stress as well. Supposing a tensile strain in the 70 nm thick compacted oxide layer of 1%, the expected resonance wavelength shift can be estimated. Based on the rough estimation (considering only effects in two dimensions, in the x-y-plane) of the silicon oxide being a 70 nm wide string (with Young's modulus of 73 GPa) that puts the silicon (a 220 nm thick string with Young's modulus of 150 GPa) under tensile stress from both sides, it becomes clear that the silicon is under less strain than the oxide cladding, because of the factor two difference in Young's modulus and a factor of three difference in width. Furthermore the oxide under the silicon conducts part of the stress. Altogether it can be estimated that the average strain in the silicon is about an order of magnitude lower than in the oxide, i.e. about $10^{-3}$ for 1% strain in the compacted oxide.

Considering that the silicon lattice is stretched in one dominant direction (in the x-direction, i.e. parallel to the cladding surface and perpendicular to the propagation direction in the core), that $p_{12}$ is much smaller than $p_{11}$, and that the propagating quasi-TE mode has its electric field primarily along the x-as, equation (3) becomes:

$$\Delta\left(\frac{1}{n^2}\right)_x = p_{11}S_x \quad (5)$$

After some manipulation this gives (with the convention $n_x=n$ wherein $n_x$ is the effective index along the x-axis):

$$\frac{\Delta n}{n} = -\frac{n^2}{2}p_{11}S_x \quad (6)$$

This leads to a resonance wavelength shift of $$\Delta\lambda = -\lambda\frac{n^2}{2}p_{11}S_x \quad (7)$$

which yields an estimated wavelength shift $\Delta\lambda$ of about 1 nm for s silicon strain of $10^{-3}$ resulting from a 1% compaction of the oxide cladding. This supports the fact that tensile strain in the silicon waveguide can account for the observed wavelength shift of about 5 nm (since the expected volume compaction is 5%).

Figure 6:
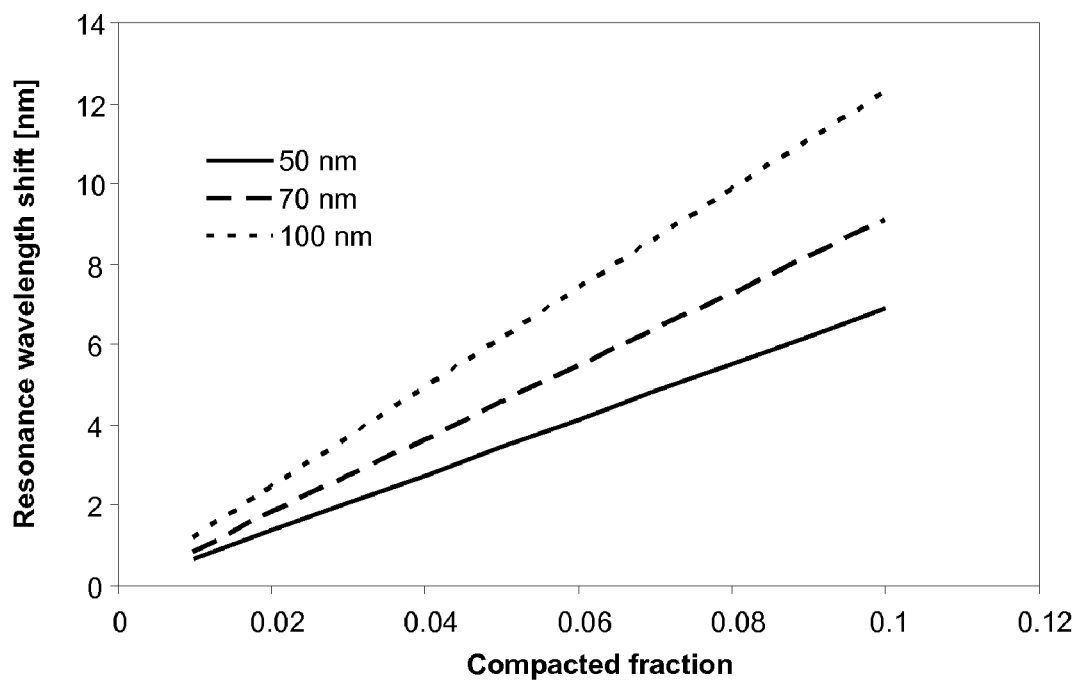
FIG. 6 shows the calculated resonance wavelength shift due to strain in the silicon lattice, for varying volume compaction rates and for different compacted layer thicknesses.

This was also verified with finite element simulations. A variable mesh size was used, down to 10 nm where a large stress gradient is reached. In case of a 10% compacted oxide layer with a thickness of 70 nm, the stress in the silicon lattice is between 1 GPa and 3 GPa, which is of the same order of magnitude than what can for example be achieved by depositing straining layers. A compaction of 10% of the oxide is the maximum value estimated from literature. The effect of the compaction induced strain in the silicon material on the effective index of the supported modes and thus on the resonance wavelength shift was estimated without performing detailed simulations of the optical mode profile in the strained lattice. The average silicon strain in the dominant direction, i.e. orthogonal to the waveguide propagation direction and parallel to the plane of the cladding surface (x-direction), was calculated. The resonance wavelength shift was calculated by using only the $p_{11}$ component of the silicon elasto-optical tensor. This shift was calculated for varying oxide compaction rates and for three different compacted layer thicknesses (50 nm, 70 nm and 100 nm). The results are shown in FIG. 6. From these results it can be concluded that the resonance wavelength shift increases with increasing volume compaction rate and with increasing thickness of the compacted layer. The calculations show resonance wavelength shifts in the range between 1 nm and 12 nm, showing that a 5 nm resonance wavelength shift as obtained in the experiments is indeed realistic. The results also confirm that compaction induced strain is the dominant trimming effect.

In both the in situ and ex situ experiments a different trimming efficiency was observed for different beam currents and irradiated areas. The trimming speed (or efficiency) can be converted to units of resonance wavelength shift per unit of applied dose. This takes into account the beam current and the irradiated area, and is therefore a measure of the physical trimming efficiency. The results are shown in Table 1.

TABLE 1

| experiment | | irradiated area [µm²] | beam current [nA] | trimming efficiency [pm/mC cm⁻²] |
|---|---|---|---|---|
| in situ | step 1 | 25.6 × 22.1 | 0.21 | 86 |
| | step 2 | 25.6 × 22.1 | 0.21 | 76 |
| | step 3 | 17.1 × 14.8 | 0.84 | 22 |
| ex situ | step 1 | 25.6 × 22.1 | 0.14 | 86 |
| | step 2 | 25.6 × 22.1 | 0.56 | 24 |

It is clear that the trimming efficiency for both in situ and ex situ experiments is of the same order of magnitude, and that it is in both cases lower for higher beam currents. Although a difference in trimming efficiency for racetrack rings with different geometries can be expected because the generated strain in the coupling section and the bends are different, this observation is in contrast with the expected independence of exposure parameters. This deviation from linear behavior is possibly caused by a difference in secondary electron yield or current leakage through the oxide cladding that causes a higher charge buildup on the sample surface. This results in more reflected electrons and a reduced effective exposure current. This effect may for example be alleviated by providing conducting paths near the irradiated region.

Although experiments were performed with an electron beam, they may for example also be performed with UV irradiation since the penetration depth at wavelengths between 200 nm and 400 nm is sufficiently low to create compaction induced strain. Ring resonators in other semiconductor materials can be compacted in a similar way, as well as other kinds of cavities, such as photonic crystal cavities.

Figure 7:
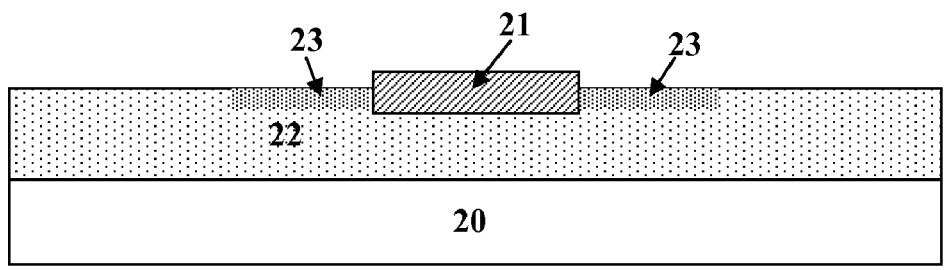
FIG. 7 shows a cross section of exemplary optical waveguiding structures that may be trimmed according to a method of the present embodiments.
Figure 7:
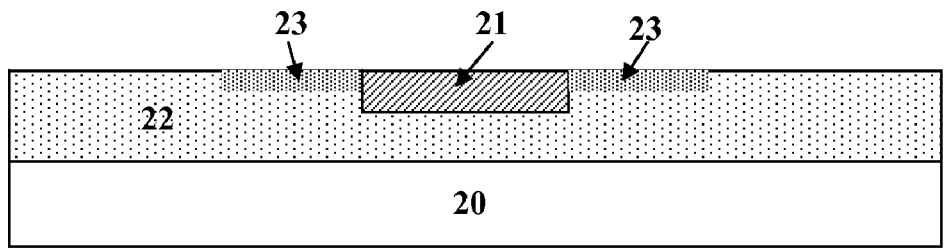

Although experiments and calculations described here were performed for a structure as shown in FIG. 5(*a*), where the ridge of core material 21 is located on top of the layer of cladding material 22, the method of the present embodiment may be used for trimming an effective refractive index of other optical waveguiding structures, such as for example structures wherein the ridge of core material 21 is at least partially embedded in the layer of cladding material 22. Examples of such structures are shown in FIG. 7.

Since many other devices in high index contrast material systems such as SOI are built up of ridge waveguides and also have a sufficient amount of the optical mode confined in oxide that can be compacted, the methods described herein are extendable to other components. For example, Arrayed Waveguide Gratings (AWG's) are used as (de)multiplexers in optical communications. Trimming by oxide compaction can lead to crosstalk suppression and enables wavelength trimming of the devices. Mach-Zehnder Interferometers (MZI's) can also be trimmed to precise wavelengths by oxide compaction in part of the device. In addition, nanophotonic components comprising photonic crystals or plasmonic structures can be trimmed by this technique. In this way one could for example make photonic crystals with a bandgap variation for wavelength demultiplexing or for the fabrication of high-Q cavities.

The invention claimed is:

1. A method for trimming an effective refractive index of an optical waveguiding structure, the optical waveguiding structure comprising one or more ridges made of a core material adjacent to a layer of cladding material, the cladding material being a compactible material, and a portion of the layer of cladding material is on top of the one or more ridges, wherein the portion of the layer of cladding material on top of the one or more ridges is less than 50 nm thick, and wherein the method comprises the steps of:

defining a compaction area on the cladding material next to at least one of the one or more ridges; and compacting the cladding material by irradiation of the cladding material in said compaction area to create a strain in the core material of the at least one ridge, whereby the effective refractive index is trimmed.

2. The method according to claim 1, wherein the compaction area comprises a first area and a second area defined on opposite sides of the at least one ridge.

3. The method according to claim 1, wherein the irradiation is performed in an irradiation area, the irradiation area comprising the compaction area of the cladding layer and an area of core material and wherein the irradiation is done at a predetermined low irradiation energy that is chosen sufficiently low to prevent penetration of irradiation through the core material up to the cladding material underneath the core material.

4. The method according to claim 1, wherein irradiating comprises irradiating by an electron beam, an ion beam or UV light.

5. The method according to claim 1, wherein the core material comprises a noncompactible material.

6. The method according to claim 1, wherein the core material comprises one of the following: silicon, InP, GaAs or ZnS.

7. The method according to claim 1, wherein the cladding material is one of the following from the group of: SiO2, SiN, SiON, Al2O3, TiO2, spin-on glass or borophosphosilicate glass.

8. The method according to claim 1, wherein the core material comprises silicon and the cladding material comprises silicon oxide.

9. The method according to claim 1, wherein the method further comprises monitoring the effective refractive index of the optical waveguiding structure during the irradiation.

10. An optical waveguiding structure comprising one or more ridges made of a core material adjacent to a layer of cladding material, the cladding material comprises a compactible material, and a portion of the layer of cladding material is on top of the one or more ridges, wherein the portion of the layer of cladding material on top of the one or more ridges is less than 50 nm thick, and wherein the layer of cladding material comprises an area of compacted cladding material next to at least one of the one or more ridges for inducing a strain in the core material of the at least one ridge, whereby an effective refractive index of the optical waveguiding structure is trimmed.

11. The optical waveguiding structure according to claim 10, wherein the area of compacted cladding material comprises a first area and a second area defined on opposite sides of the at least one ridge.

12. The optical waveguiding structure according to claim 10, wherein the difference in refractive index between the core material and the cladding material is larger than 1.

13. The optical waveguiding structure according to claim 10, wherein the core material is one of the following from the group of: silicon, InP, GaAs or ZnS.

14. The optical waveguiding structure according to claim 10, wherein the cladding material is one of the following from the group of: SiO2, SiN, SiON, Al2O3, TiO2, spin-on glass or borophosphosilicate glass.

15. The optical waveguiding structure according to claim 10, wherein the core material comprises silicon and the cladding material comprises silicon oxide.

16. The optical waveguiding structure according to claim 10, wherein the optical waveguiding structure is part of one of the following group of optical components:
a ring resonator, an arrayed waveguide grating, a mach-zehnder interferometer, a nanophotonic component comprising photonic crystals or plasmonic structures.

* * * * *